United States Patent

Courtney

[19]

[11] Patent Number: 5,969,755
[45] Date of Patent: Oct. 19, 1999

[54] MOTION BASED EVENT DETECTION SYSTEM AND METHOD

[75] Inventor: Jonathan D. Courtney, Dallas, Tex.

[73] Assignee: Texas Instruments Incorporated, Dallas, Tex.

[21] Appl. No.: 08/795,432

[22] Filed: Feb. 5, 1997

Related U.S. Application Data

[60] Provisional application No. 60/011,106, Feb. 5, 1996.

[51] Int. Cl.$^6$ ............................................ H04N 7/18
[52] U.S. Cl. ........................ 348/143; 348/135; 348/155
[58] Field of Search .................................. 348/135, 142, 348/152, 154, 155, 143, 171, 172; 382/103, 107, 236

[56] References Cited

U.S. PATENT DOCUMENTS

| 5,243,418 | 9/1993 | Kuno et al. | 358/108 |
| 5,428,774 | 6/1995 | Takahashi et al. | 395/600 |
| 5,550,965 | 8/1996 | Gabbe et al. | 395/154 |
| 5,666,157 | 9/1997 | Aviv | 348/152 |
| 5,721,692 | 2/1998 | Nagaya et al. | 364/516 |
| 5,734,737 | 3/1998 | Chang et al. | 382/107 |

FOREIGN PATENT DOCUMENTS

0 318 039  11/1988  Japan .

OTHER PUBLICATIONS

Lee, S., et al., "Video Indexing—An Approach Based on Moving Object and Track," in Wayne Niblack, editor, *Storage and Retrieval for Image and Video Databases*, Proc. SPIE 1908, 25–36 (1993).

Ioka, M, et al., "A Method for Retrieving Sequences of Images on the Basis of Motion Analysis," in *Image Storage and Retrieval Systems*, Proc. SPIE 1662, 35–46 (1992).

Day Y F, et al., "Object–Oriented Conceptual Modeling of Video Data", Supplied by Applicant, 402–408, Mar. 6, 1995.

Abe S, et al., "Scene Retrieval Method using Temporal Condition Changes", Supplied by Applicant, whole document, Jan. 1, 1993.

Hirotada Ueda, et al., "Automatic Structure Visualization for Video Editing", Supplied by Applicant, whole document, Apr. 24, 1993.

Orkisz, M, "Moving Objects Locaation in Complex Scenes Filmed by a Fixed Camera", Supplied by Applicant, 325, 327–328, Jan. 1, 1992.

*Primary Examiner*—Tommy P. Chin
*Assistant Examiner*—John Voisinet
*Attorney, Agent, or Firm*—Robert L. Troike; Richard L. Donaldson

[57] ABSTRACT

A method to provide automatic content-based video indexing from object motion is described. Moving objects in video from a surveillance camera 11 detected in the video sequence using motion segmentation methods by motion segmentor 21. Objects are tracked through segmented data in an object tracker 22. A symbolic representation of the video is generated in the form of an annotated graphics describing the objects and their movement. A motion analyzer 23 analyzes results of object tracking and annotates the graph motion with indices describing several events. The graph is then indexed using a rule based classification scheme to identify events of interest such as appearance/disappearance, deposit/removal, entrance/exit, and motion/rest of objects. Clips of the video identified by spatio-temporal, event, and object-based queries are recalled to view the desired video.

22 Claims, 11 Drawing Sheets

MOTION BASED EVENT DETECTION SYSTEM AND METHOD

This application claims priority under 35 USC §119(e)(1) of provisional application No. 60/011,106, filed Feb. 5, 1996. This application is related to co-pending application Ser. No. 08/795,434 (TI-22548) entitled, "Object Detection Method and System for Scene Change Analysis in TV and IR Data" of Jonathan Courtney, et al., filed Feb. 50, 1997. This application is incorporated herein by reference.

TECHNICAL FIELD OF THE INVENTION

This invention relates to motion event detection as used for example in surveillance.

BACKGROUND OF THE INVENTION

Advances in multimedia technology, including commercial prospects for video-on-demand and digital library systems, has generated recent interest in content-based video analysis. Video data offers users of multimedia systems a wealth of information; however, it is not as readily manipulated as other data such as text. Raw video data has no immediate "handles" by which the multimedia system user may analyze its contents. Annotating video data with symbolic information describing its semantic content facilitates analysis beyond simple serial playback.

Video data poses unique problems for multimedia information systems that text does not. Textual data is a symbolic abstraction of the spoken word that is usually generated and structured by humans. Video, on the other hand, is a direct recording of visual information. In its raw and most common form, video data is subject to little human-imposed structure, and thus has no immediate "handles" by which the multimedia system user may analyze its contents.

For example, consider an on-line movie screenplay (textual data) and a digitized movie (video and audio data). If one were analyzing the screenplay and interested in searching for instances of the word "horse" in the text, many text searching algorithms could be employed to locate every instance of this symbol as desired. Such analysis is common in on-line text databases. If, however, one were interested in searching for every scene in the digitized movie where a horse appeared, the task is much more difficult. Unless a human performs some sort of pre-processing of the video data, there are no symbolic keys on which to search. For a computer to assist in the search, it must analyze the semantic content of the video data itself. Without such capabilities, the information available to the multimedia system user is greatly reduced.

Thus, much research in video analysis focuses on semantic content-based search and retrieval techniques. The term "video indexing" as used herein refers to the process of marking important frames or objects in the video data for efficient playback. An indexed video sequence allows a user not only to play the sequence in the usual serial fashion, but also to "jump" to points of interest while it plays. A common indexing scheme is to employ scene cut detection to determine breakpoints in the video data. See H. Zang, A. Kankanhalli, and Stephen W. Smoliar, Automatic Partitioning of Full Motion Video, *Multimedia Systems*, 1, 10–28 (1993). Indexing has also been performed based on camera (i.e., viewpoint) motion, see A. Akutsu, Y. Tonomura, H. Hashimoto, and Y. Ohba, Video Indexing Using Motion Vectors, in Petros Maragos, editor, *Visual Communications and Image Processing* SPIE 1818, 1552–1530 (1992), and object motion, see M. Ioka and M. Kurokawa, A Method for Retrieving Sequences of Images on the Basis of Motion Analysis, in *Image Storage and Retrieval Systems*, Proc. SPIE 1662, 35–46 (1992), and S. Y. Lee and H. M. Kao, Video Indexing-an approach based on moving object and track, in Wayne Niblack, editor, *Storage and Retrieval for Image and Video Databases*, Proc. SPIE 1908, 25–36 (1993).

Using breakpoints found via scene cut detection, other researchers have pursued hierarchical segmentation to analyze the logical organization of video sequences. For more on this, see the following: G. Davenport, T. Smith, and N. Pincever, Cinematic Primitives for Multimedia, *IEEE Computer Graphics & Applications*, 67–74 (1991); M. Shibata, A temporal Segmentation Method for Video Sequences, in Petros Maragos, editor, *Visual Communications and Image Processing*, Proc SPIE 1818, 1194–1205 (1992); D. Swanberg, C-F. Shu, and R. Jain, Knowledge Guided Parsing in Video Databases in Wayne Niblack, editor, *Storage and Retrieval for Image and Video Databases*, Proc. SPIE 1908, 13–24 (1993). In the same way that text is organized into sentences, paragraphs and chapters, the goal of these techniques is to determine a hierarchical grouping of video sub-sequences. Combining this structural information with content abstractions of segmented sub-sequences provides multimedia system users a top-down view of video data. For more details see F. Arman, R. Depommier, A. Hsu, and M. Y. Chiu, Content-Based Browsing of Video Sequences, in *Proceedings of ACM International Conference on Multimedia*, (1994).

Closed-circuit television (CCTV) systems provide security personnel a wealth of information regarding activity in both indoor and outdoor domains. However, few tools exist that provide automated or assisted analysis of video data; therefore, the information from most security cameras is under-utilized.

Security systems typically process video camera output by either displaying the video on monitors for simultaneous viewing by security personnel and/or recording the data to time-lapse VCR machines for later playback. Serious limitations exist in these approaches:

Psycho-visual studies have shown that humans are limited in the amount of visual information they can process in tasks like video camera monitoring. After a time, visual activity in the monitors can easily go unnoticed. Monitoring effectiveness is additionally taxed when output from multiple video cameras must be viewed.

Time-lapse VCRs are limited in the amount of data that they can store in terms of resolution, frames per second, and length of recordings. Continuous use of such devices requires frequent equipment maintenance and repair.

In both cases, the video information is unstructured and un-indexed. Without an efficient means to locate visual events of interest in the video stream, it is not cost-effective for security personnel to monitor or record the output from all available video cameras.

Video motion detectors are the most powerful of available tools to assist in video monitoring. Such systems detect visual movement in a video stream and can activate alarms or recording equipment when activity exceeds a pre-set threshold. However, existing video motion detectors typically sense only simple intensity changes in the video data and cannot provide more intelligent feedback regarding the occurrence of complex object actions such as inventory theft.

SUMMARY OF THE INVENTION

In accordance with one embodiment of the present invention, a method is provided to perform video indexing from object motion. Moving objects are detected in a video sequence using a motion segmentor. Segmented video objects are recorded and tracked through successive frames. The path of the objects and intersection with paths of the other objects are determined to detect occurrence of events. An index mark is placed to identify these events of interest such as appearance/disappearance, deposit/removal, entrance/exit, and motion/rest of objects.

These and other features of the invention that will be apparent to those skilled in the art from the following detailed description of the invention, taken together with the accompanying drawings.

DESCRIPTION OF THE PREFERRED EMBODIMENTS OF THE PRESENT INVENTION

Figure 1:
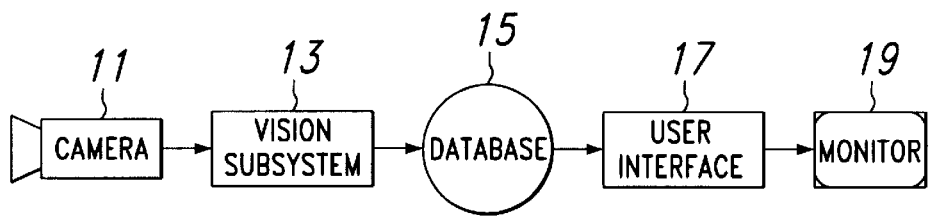
FIG. 1 is an overview diagram of a system for automatically indexing pre-recorded video in accordance with one embodiment of the present invention.

FIG. 1 shows a high-level diagram of the Automatic Video Indexing (AVI) system 10 according to one embodiment of the present invention. In this view, a camera 11 provides input to a vision subsystem 13 including a programmed computer which processes the incoming video which has been digitized to populate a database storage 15. The term camera as used herein may be a conventional television (TV) camera or infrared (IR) camera. A user may then analyze the video information using an interface 17 including a computer to the database 15 via spatio-temporal, event-, and object-based queries. The user interface 17 plays video subsequences which satisfy the queries to a monitor 19.

Figure 2:
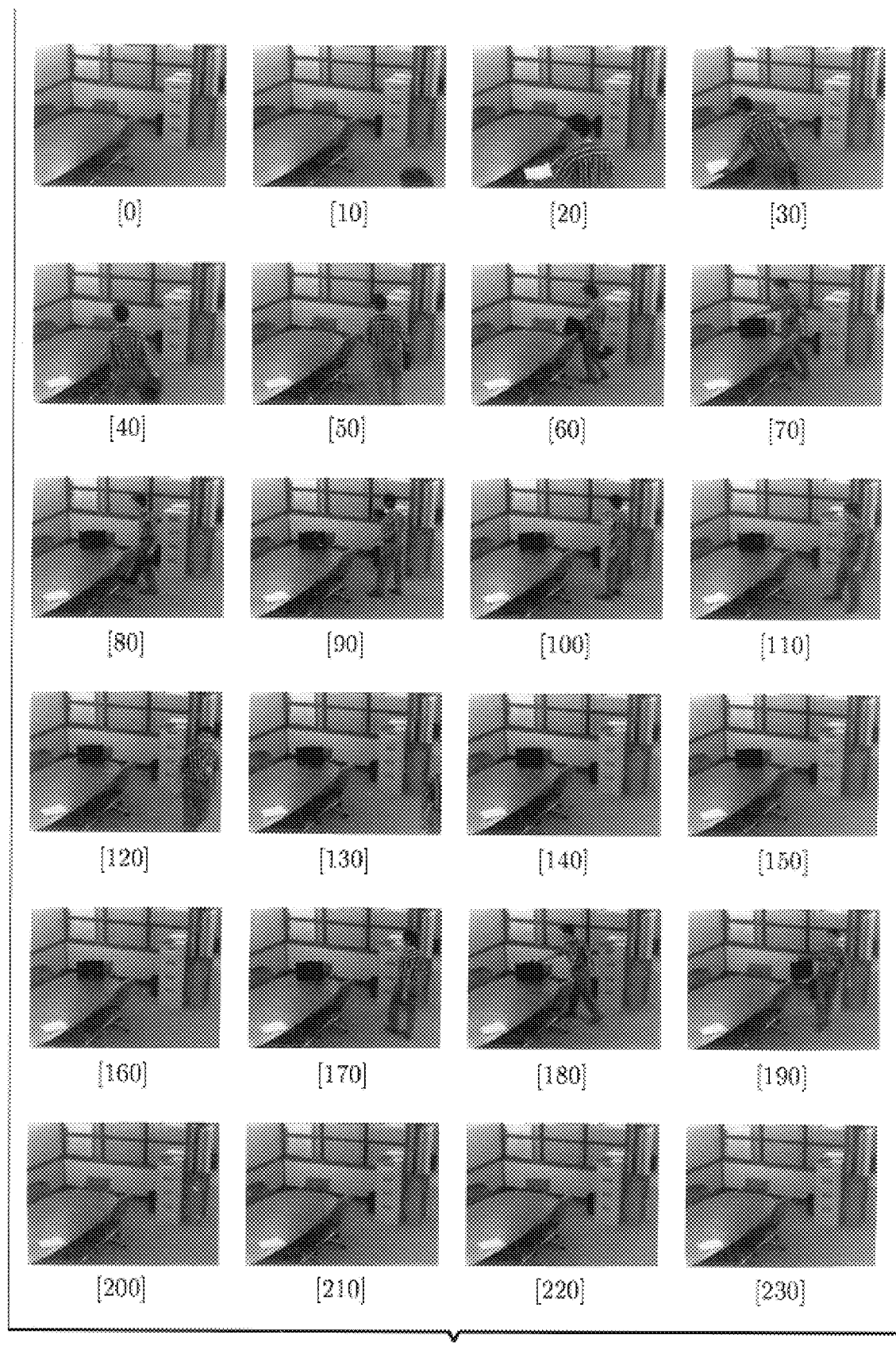
FIG. 2 is a sequence of frames of video (test sequence 1) with the frame numbers below each image.
Figure 3:
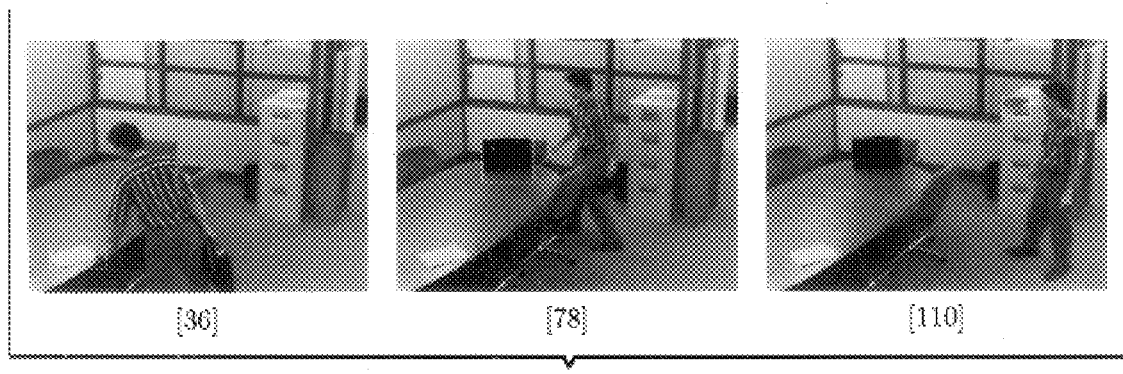
FIG. 3 illustrates points in the video sequence that satisfy the query "show all deposit events"

FIG. 2 shows frames from a video sequence with content similar to that found in security monitoring applications. In this sequence, a person enters the scene, deposits a piece of paper, a briefcase, and a book, and then exits. He then re-enters the scene, removes the briefcase, and exits again. The time duration of this example sequence is about 1 minute; however, the action could have been spread over a number of hours. By querying the AVI database 15, a user can jump to important events without playing the entire sequence front-to-back. For example, if a user formed the query "show all deposit events in the sequence", the AVI system 10 would respond with sub-sequences depicting the person depositing the paper, briefcase and book. FIG. 3 shows the actual result given by the AVI system in response to this query where the system points to the placement of the paper, briefcase and book, and boxes highlight the objects contributing to the event.

Figure 4:
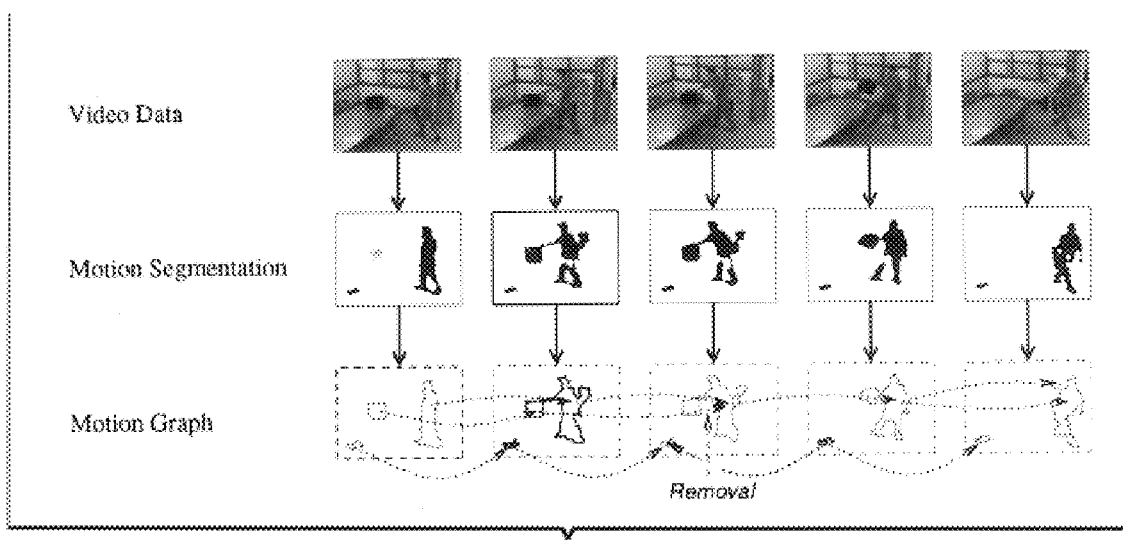
FIG. 4 illustrates the relation between video data, motion segmentation and video meta-information.

In processing the video data, the AVI vision subsystem 13 employs motion segmentation techniques to segment foreground objects from the scene background in each frame. For motion segmentation techniques see S. Yalamanchili, W. Martin, and J. Aggarwal, Extraction of Moving Object Descriptions via Differencing, *Computer Graphics and Image Processing*, 18, 188–201 (1982); R. Jain, Segmentation of Frame Sequences Obtained by a Moving Observer, *IEEE Transactions on Pattern Analysis and Machine Intelligence*, 6, 624–629 (1984); A. Shio and J. Sklansky, Segmentation of People in Motion, in *IEEE Workshop on Visual Motion*, 325–332 (1991); and D. Ballard and C. Brown, *Computer Vision*, Prentice-Hall, Englewood Cliffs, New Jersey (1982) to segment foreground objects from the scene background in each frame. It then analyzes the segmented video to create a symbolic representation of the foreground objects and their movement. This symbolic record of video content is referred to as the video "meta-information" (see FIG. 4). FIG. 4 shows the progression of the video data frames, the corresponding motion segmentation and the corresponding meta-information. This meta-information is stored in the database in the form of an annotated directed graph appropriate for later indexing and search. The user interface 17 operates upon this information rather than the raw video data to analyze semantic content.

The vision subsystem 13 records in the meta-information the size, shape, position, time-stamp, and image of each object in every video frame. It tracks each object through successive video frames, estimating the instantaneous velocity at each frame and determining the path of the object and its intersection with the paths of other objects. It then classifies objects as moving or stationary based upon velocity measures on their path.

Finally, the vision subsystem 13 scans through the meta-information and places an index mark at each occurrence of eight events of interest: appearance/disappearance, deposit/removal, entrance/exit, and motion/rest of objects. This indexing is done using heuristics based on the motion of the objects recorded in the meta-information. For example, a moving object that "spawns" a stationary object results in a "deposit" event. A moving object that intersects and then removes a stationary object results in a "removal" event.

The system stores the output of the vision subsystem—the video data, motion segmentation, and meta-information—in the database 15 for retrieval through the user interface 17. The interface allows the user to retrieve a video sequence of interest, play it forward or backward and stop on individual frames. Furthermore, the user may specify queries on a video sequence based upon spatial-temporal, event-based, and object-based parameters.

For example, the user may select a region in the scene and specify the query "show me all objects that are removed from this region of the scene between 8 am and 9 am." In this case, the user interface searches through the video meta-information for objects with timestamps between 8 am and 9 am, then filters this set for objects within the specified region that are marked with "removal" event tags. This results in a set of objects satisfying the user query. From this set, it then assembles a set of video "clips" highlighting the query results. The user may select a clip of interest and proceed with further video analysis using playback or queries as before.

The following is a description of some of the terms and notation used in the remainder of this application.

A sequence S is an ordered set of N frames, denoted $S=\{F_0, F_1, \ldots, F_{N-1}\}$, where $F_n$ is the frame number n in the sequence.

A clip is a 4-tuple $C=(S,f,s,l)$, where S is a sequence with N frames, and f, s, and l are frame numbers such that $0 \leq f \leq s \leq l \leq N-1$. Here, $F_f$ and $F_l$ are the first and last valid frames in the clip, and $F_s$ is the current frame. Thus, a clip specifies a sub-sequence with a state variable to indicate a "frame of interest".

A frame F is an image I annotated with a timestamp t. Thus, frame number n is denoted by the pair $F_n=(I_n, t_n)$.

An image I is an r by c array of pixels. The notation I (i,j) indicates the pixel at coordinates (row i, column j) in I, wherein $i=0,\ldots,r-1$ and $j=0,\ldots,c-1$. For purposes of this discussion, a pixel is assumed to be an intensity value between 0 and 255.

Figure 5:
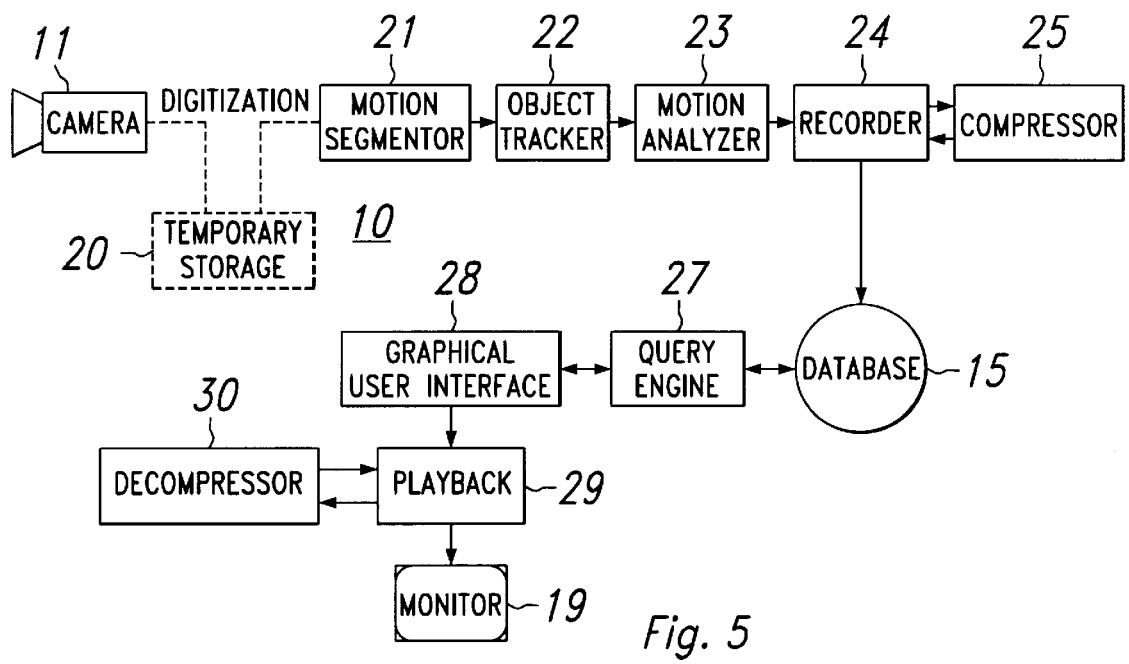
FIG. 5 illustrates the Automatic Video Indexing system architecture.

FIG. 5 shows the AVI system in detail. Note that the motion segmentor 21, object tracker 22, motion analyzer 23, recorder 24, and compressor 25 comprise the vision subsystem 13 of FIG. 1. Likewise, the query engine, 27, graphical user interface 28, playback device 29 and decompression modules 30 comprise the user interface 17. The subsequent paragraphs describe each of these components in detail.

The current implementation of the AVI system supports batch, rather than real-time, processing. Therefore, frames are digitized into a temporary storage area 20 before further processing occurs. A real-time implementation would bypass the temporary storage 20 and process the video in a pipelined fashion.

Figure 6:
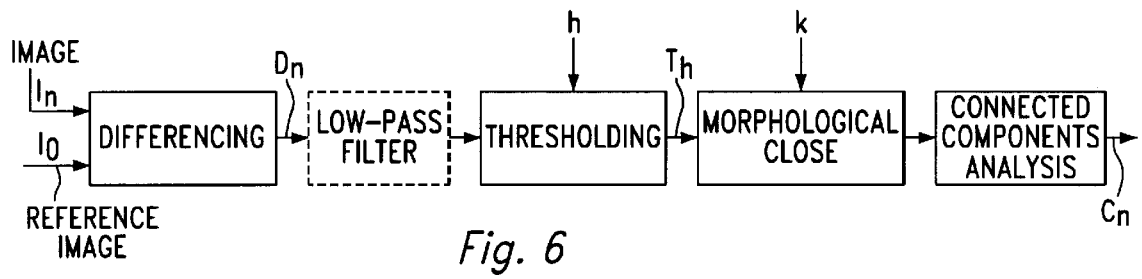
FIG. 6 illustrates the motion segmentor.

FIG. 6 shows the motion segmentor in more detail. For each frame $F_n$ in the sequence, the motion segmentor 21 computes segmented image $C_n$ as $$C_n = ccomps(T_h \cdot s),$$

where $T_h$ is the binary image resulting from thresholding the absolute difference of images $I_n$ and $I_o$ at h, $T_h \cdot k$ is the morphological close operation on $T_h$ with structuring element k, and the function $ccomps(\cdot)$ performs connected components analysis resulting in a unique label for each connected region in image $T_h \cdot k$. The image $T_h$ is defined as $$T_h(i,j) = \begin{cases} 1 & \text{if } |D_n(i,j)| \geq h \\ 0 & \text{otherwise} \end{cases}$$

for all pixels (i, j) in $T_h$, where $D_n$, is the difference image of $I_n$ and $I_o$ such that $$D_n(i,j) = I_n(i,j) - I_0(i,j).$$

For noisy data (such as from an infrared camera), the image $D_n$ may be smoothed via a low-pass filter to create a more consistent difference image.

Finally, the operation $a \cdot k$ is defined as $$a \cdot k = (a \oplus k) \ominus k,$$

where $\oplus$ is the morphological dilation operator and $\ominus$ is the morphological erosion operator.

Figure 7:
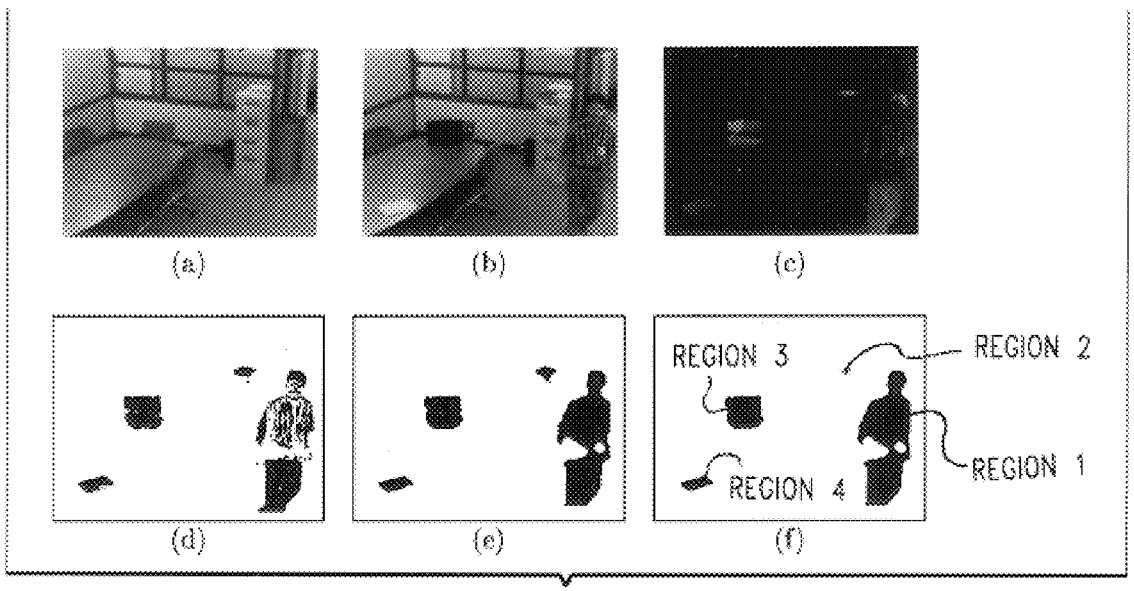
FIG. 7 illustrates motion segmentation example where (a) is the reference image $I_o$; (b) Image $I_n$; (c) absolute difference $|D_n=I_n-I_o|$; (d) Threshold image $T_h$; (e) result of morphological close operation; (f) result of connected components analysis.

FIG. 7 shows an example of this process. FIG. 7a is the reference image $I_0$; FIG. 7b is the image $I_n$; FIG. 7c is the absolute difference $|D_n = I_n - I_0|$; FIG. 7d is the thresholded image $T_h$, which highlights motion regions in the image; FIG. 7e is the result of the morophogical close operation, which joins together small regions into smoothly shaped objects; FIG. 7f is the result of connected components analysis, which assigns each detected object a unique label such as regions 1–4. This result is $C_n$, the output of the motion segmentor.

Note that the technique uses a "reference image" for processing. This is nominally the first image from the sequence, $I_0$. For many applications, the assumption of an available reference image is not unreasonable; video capture is simply initiated from a fixed-viewpoint camera when there is limited motion in the scene. Following are some reasons why this assumption may fail in other applications:

1. Gradual lighting changes may cause the reference frame to grow "out of date" over long video sequences, particularly in outdoor scenes. Here, more sophisticated techniques involving cumulative differences of successive video frames must be employed.
2. The viewpoint may change due to camera motion. In this case, camera motion compensation must be used to "subtract" the moving background from the scene.
3. A object may be present in the reference frame and move during the sequence. This causes the motion segmentation process to incorrectly detect the background region exposed by the object as if it were a newly-appearing stationary object in the scene.

A straightforward solution to problem 3 is to apply a test to non-moving regions detected by the motion segmentation process to determine if a given region is the result of either (1) a stationary object present in the foreground or (2) background exposed by a foreground object present in the reference image.

In the case of video data from a TV camera, this test is implemented based on the following observation: if the region detected by the segmentation of image $I_n$ is due to the motion of an object present in the reference image (i.e., due to "exposed background"), a high probability exists that the boundary of the segmented region will match intensity edges detected in $I_0$. If the region is due to the presence of a object in the current image, a high probability exists that the region boundary will match intensity edges in $I_n$. The test is implemented by applying an edge detection operator (See D.

Ballard and C. Brown, *Computer Vision*, Prentice-Hall, Englewood Cliffs, N.J., 1982) to the current and reference images and checking for coincident boundary pixels in the segmented region of $C_n$.

In the case of video data from an IR camera, foreground objects may not have easily detectable edges due to heat diffusion and image blurring. In data from some cameras, however, objects exhibit a contrasting halo due to opto-mechanical image sharpening. See A. Rosenfeld and A. Kak, *Digital Picture Processing*, 2ed., Volume 1, Academic Press, New York, N.Y., 1982. Thus, the test may be implemented by comparing the variance of pixel intensities within the region of interest in the two images. Since background regions tend to exhibit constant pixel intensities, the variance will be highest for the image containing the foreground object.

The object detection method for scene change analysis in TV and IR data is described in above cited application of Courtney, et al. incorporated herein by reference and in Appendix A.

Figure 8:
FIG. 8 illustrates reference image from a TV camera modified to account for the exposed background region.

If either test supports the hypothesis that the region in question is due to exposed background, the reference image is modified by replacing the object with its exposed background region (see FIG. 8).

No known motion segmentation technique is perfect. The following are errors typical of many motion segmentation techniques:

1. True objects will disappear temporarily from the motion segmentation record. This occurs when there is insufficient contrast between an object and an occluded background region, or if an object is partially occluded by a "background" structure (for instance, a tree or pillar present in the scene).
2. False objects will appear temporarily in the motion segmentation record. This is caused by light fluctuations or shadows cast by moving objects.
3. Separate objects will temporarily join together. This typically occurs when two or more objects are in close proximity or one object occludes another object.
4. Single objects will split into two regions and then rejoin. This occurs when a portion of an object has insufficient contrast with the background it occludes.

Instead of applying incremental improvements to relieve the shortcomings of motion segmentation, the AVI technique addresses these problems at a higher level where information about the semantic content of the video data is more readily available. The object tracker and motion analyzer units described later employ object trajectory estimates and domain knowledge to compensate for motion segmentation inaccuracies and thereby construct a more accurate record of the video content.

The motion segmentor 21 output is processed by the object tracker 22. Given a segmented image $C_n$ with P uniquely-labeled regions corresponding to foreground objects in the video, the system generates a set of features to represent each region. This set of features is named a "V-object" (video-object), denoted $V_n^p$, p=1, . . . ,P. A V-object contains the label, centroid, bounding box, and shape mask of its corresponding region, as well as object velocity and trajectory information by the tracking process.

V-objects are then tracked through the segmented video sequence. Given segmented images $C_n$ and $C_{n+1}$ with V-objects $V_n = \{V_n^p; p=1, \ldots, P\}$ and $V_{n+1} = \{V_{n+1}^q; q=1, \ldots, Q\}$, respectively, the motion tracking process "links" V-objects $V_n^p$ and $V_{n+1}^q$ if their position and estimated velocity indicate that they correspond to the same real-world object appearing in frames $F_n$ and $F_{n+1}$. This is determined using linear prediction of V-object positions and a "mutual nearest neighbor" criterion via the following procedure:

1. For each V-object $V_n^p \in V_n$, predict its position in the next frame using $$\dot{\mu}_n^p = \mu_n^p + \upsilon_n^p \cdot (t_{n+1} - t_n),$$

where $\dot{\mu}_n^p$ is the predicted centroid of $V_n^p$ in $C_{n+1}$, $\mu_n^p$ is the centroid of $V_n^p$ measured in $C_n$, $\upsilon_n^p$ is the estimated (forward) velocity of $V_n^p$, and $t_{n+1}$ and $t_n$ are the timestamps of frames $F_{n+1}$ and $F_n$, respectively. Initially, the velocity estimate is set to $\upsilon_n^p = (0,0)$.

2. For each $V_n^p \in V_n$, determine the V-object in the next frame with centroid nearest $\dot{\mu}_n^p$. This "nearest neighbor" is denoted $n_n^p$. Thus, $$n_n^p = V_{n+1}^r \ni \|\dot{\mu}_n^p - \mu_{n+1}^r\| \le \|\dot{\mu}_n^p - \mu_{n+1}^q\| \forall q \ne r$$

3. For every pair $(V_n^p, n_n^p = V_{n+1}^r)$ for which no other V-objects in $V_n$ have $V_{n+1}^r$ as a nearest neighbor, estimate $\upsilon_{n+1}^r$; the (forward) velocity of $V_{n+1}^r$ as $$\upsilon_{n+1}^r = \frac{\mu_{n+1}^r - \mu_n^p}{t_{n+1} - t_n}; \tag{1}$$

otherwise, set $\upsilon_{n+1}^r = (0,0)$.

These steps are performed for each $C_n$, n=0,1, . . . , N−2. Steps 1 and 2 find nearest neighbors in the subsequent frame for each V-object. Step 3 generates velocity estimates for V-objects that can be unambiguously tracked; this information is used in step 1 to predict V-object positions for the next frame.

Next, steps 1–3 are repeated for the reverse sequence, i.e., $C_n$, n=N−1, N−2, . . . , 1. This results in a new set of predicted centroids, velocity estimates, and nearest neighbors for each V-object in the reverse direction. Thus, the V-objects are tracked both forward and backward through the sequence. The remaining steps are then performed:

4. V-objects $V_n^s$ and $V_{n+1}^r$ are mutual nearest neighbors if $n_n^s = V_{n+1}^r$ and $n_{n+1}^r = V_n^s$. (Here, $n_n^s$ is the nearest neighbor of $V_n^s$ in the forward direction, and $n_{n+1}^r$ is the nearest neighbor of $V_{n+1}^r$, in the reverse direction.) For each pair of mutual nearest neighbors $(V_n^s, V_{n+1}^r)$ create a primary link from $V_n^s$ to $V_{n+1}^r$.

5. For each $V_n^p \in V_n$ without a mutual nearest neighbor, create a secondary link from $V_n^p$ to $n_n^p$ if the predicted centroid $\dot{\mu}_n^p$ is within $\epsilon$ of $n_n^p$ where $\epsilon$ is some small distance.

6. For each $V_{n+1}^r$ in $V_{n+1}$ without a mutual nearest neighbor, create a secondary link from $n_{n+1}^q$, to $V_{n+1}^q$ if the predicted centroid $\dot{\mu}_n^p$ is within $\epsilon$ of $n_{n+1}^q$.

The object tracking procedure uses the mutual nearest neighbor criterion (step 4) to estimate frame-to-frame V-object trajectories with a high degree of confidence. Pairs of mutual nearest neighbors are connected using a "primary" link to indicate that they are highly likely to represent the same real-world object in successive video frames.

Steps 5–6 associate V-objects that are tracked with less confidence but display evidence that they might result from the same real-world object. Thus, these objects are joined by "secondary" links. These steps are necessary to account for the "split" and "join" type motion segmentation errors as described above.

The object tracking process results in a list of V-objects and connecting links that form a directed graph (digraph)

representing the position and trajectory of foreground objects in the video sequence. Thus, the V-objects are the nodes of the graph and the connecting links are the arcs. This motion graph is the output of the object tracker.

Figure 9:
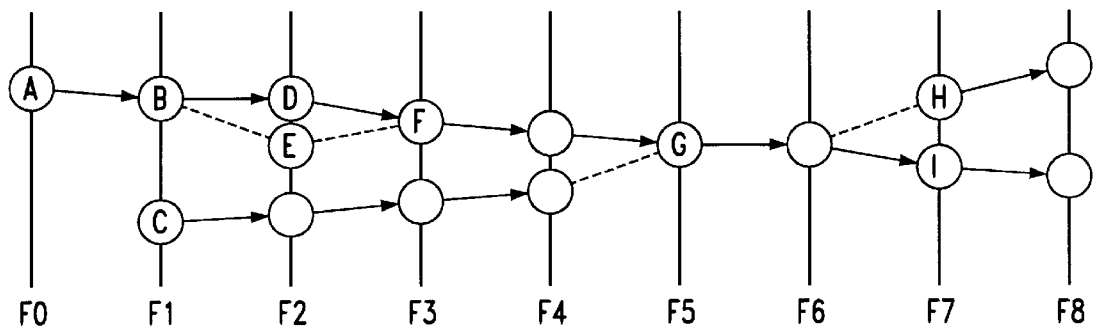
FIG. 9 illustrates the output of the object tracking stage for a hypothetical sequence of 1-D frames where vertical lines labeled "$F_n$" represent frame numbers n and where primary links are solid lines and secondary links are dashed.

FIG. 9 shows a motion graph for a hypothetical sequence of one-dimensional frames. Here, the system detects the appearance of an object at A and tracks it to the V-object at B. Due to an error in motion segmentation, the object splits at D and E, and joins at F. At G, the object joins with the object tracked from C due to occlusion. These objects split at H and I. Note that primary links connect the V-objects that were most reliably tracked.

Figure 10:
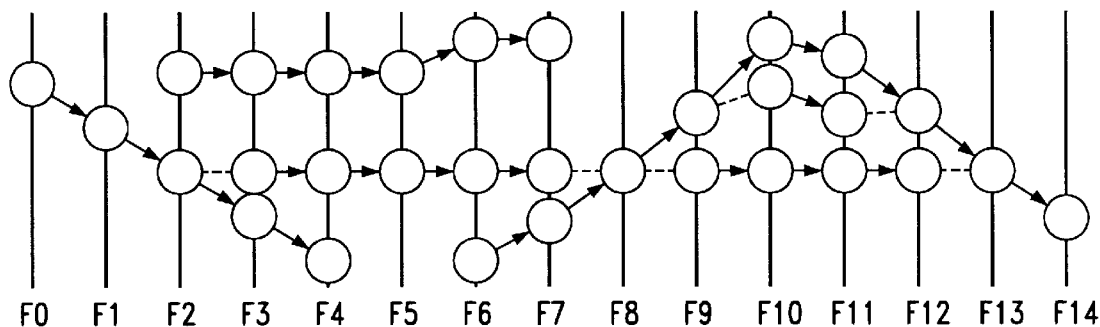
FIG. 10 illustrates an example motion graph for a sequence of 1-D frames.

The motion analyzer 23 analyzes the results of the object tracker and annotates the motion graph with index marks describing several events of interest. This process proceeds in two parts: V-object grouping and V-object indexing. FIG. 10 shows an example motion graph for a hypothetical sequence of 1-D frames discussed in the following sections.

First, the motion analyzer hierarchically groups V-objects into structures representing the paths of objects through the video data. Using graph theory terminology See G. Chartland and O. Oellermann, *Applied and Algorithmic Graph Theory*, McGraw-Hill, New York (1993), five groupings are defined for this purpose:

A stem $M=\{V_i: i=1,2,\ldots,N_M\}$ is a maximal-size, directed path (dipath) of two or more V-objects containing no secondary links, meeting all of the following conditions:

outdegree $(V_i) \leq 3$ for $1 \leq i \leq N_B$, indegree $(V_i) \leq 1$ for $1 \leq i \leq N_B$, and either $$\mu_1 \approx \mu_2 \approx \ldots \approx \mu_{N_M} \qquad (2)$$

or $$\mu_1 \neq \mu_2 \neq \ldots \neq \mu_{N_M}, \qquad (3)$$

where $\mu_i$ is the centroid of V-object $V_i \in M$.

Figure 11:
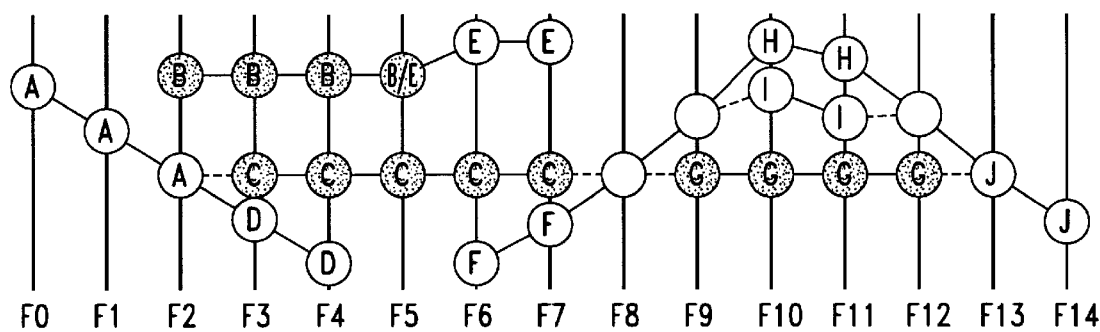
FIG. 11 illustrates stems.

Thus, a stem represents a simple trajectory of a stationary object through two or more frames. FIG. 11 labels V-objects from FIG. 10 belonging to separate stems with the letters "A" through "J".

Stems are used to determine the "state" of real-world objects, i.e. whether they are moving or stationary. If Equation 2 is true, then the stem is classified as stationary; if Equation 3 is true, then the stem is classified as moving. FIG. 11 highlights stationary stems; the remainder are moving.

Figure 12:
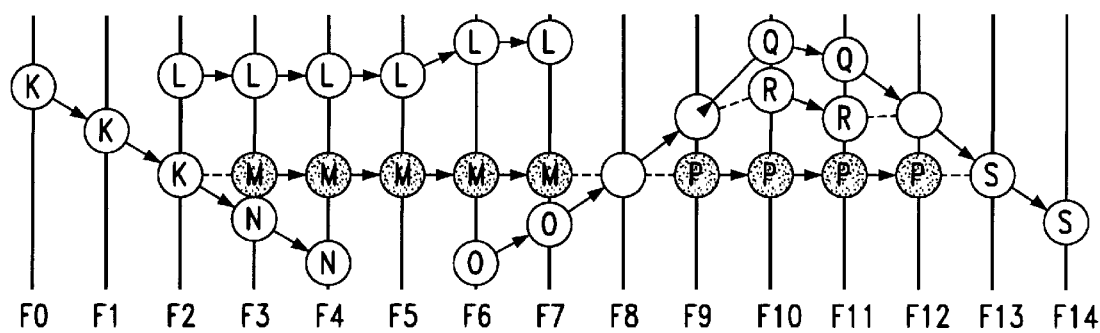
FIG. 12 illustrates branches.

A branch $B=\{V_i: i=1,2,\ldots,N_B\}$ is a maximal-size dipath of two or more V-objects containing no secondary links, for which outdegree $(V_i) \leq 1$ for $1 \leq i \leq N_B$ and indegree $(V_i) \leq 1$ for $1 \leq i \leq N_B$. FIG. 12 labels V-objects belonging to branches with the letters "K" through "S". A branch represents a highly reliable trajectory estimate of an object through a series of frames.

If a branch consists entirely of a single stationary stem, then it is classified as stationary; otherwise, it is classified as moving. Branches "M" and "P" in FIG. 12 (highlighted) are stationary; the remainder are moving.

Figure 13:
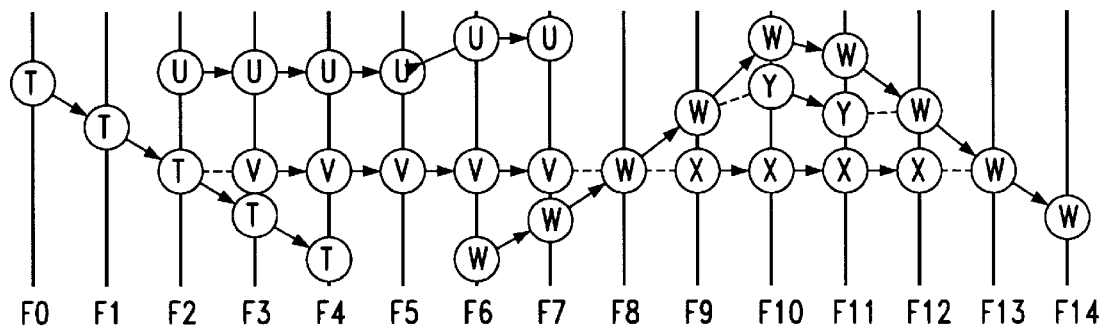
FIG. 13 illustrates trails.

A trail L is maximal-size dipath of two or more V-objects that contains no secondary links. This grouping represents the object tracking stage's best estimate of an object trajectory using the mutual nearest neighbor criterion. FIG. 13 labels V-objects belonging to trails with the letters "T" through "Y".

A trail and the V-objects it contains are classified as stationary if all the branches it contains are stationary, and moving if all the branches it contains are moving. Otherwise, the trail is classified as unknown. Trails "V" and "X" in FIG. 13 are stationary; the remainder are moving.

A track $K=\{L_1, G_1, \ldots, L_{Nk-1}, G_{Nk-1}, L_{Nk}\}$ is a dipath of maximal size containing trails $\{L_i: 1 \leq i \leq N_K\}$, and connecting dipaths $\{G_i: 1 \leq i \leq N_K\}$. For each $G_i \in K$ there must exist a dipath $$H\{|V_i^l, G_i, V_{i+1}^1\}$$

(where $V_i^l$ is the last V-object in $L_i$, and $V_{i+1}^1$, is the first V-object in $L_{i+1}$), such that every $V_j \in H$ meets the requirement $$\mu_i^l + \upsilon_i^l \cdot (t_j - t_i^l) \approx \mu_j; \qquad (4)$$

where $\mu_i^l$ is the centroid of $V_i^l$, $\upsilon_i^l$ is the forward velocity of $V_i^l$, $(t_j - t_i^l)$ is the time difference between the frames containing $V_j$ and $V_i^l$, and $\mu_j$ is the centroid of $V_j$. Thus, Equation 4 specifies that the estimated trajectory of V-object $V_i^l$ must intersect every $V_j$ on path H.

Figure 14:
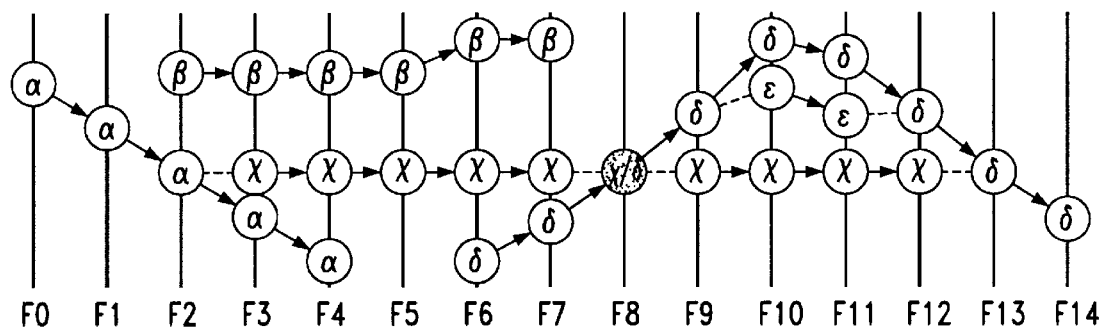
FIG. 14 illustrates tracks.

A track represents the trajectory estimate of an object that may undergo occlusion by a moving object one or more times in a sequence. The motion analyzer uses Equation 4 to attempt to follow an object through frames where it is occluded. FIG. 14 labels V-objects belonging to tracks with the letters $\alpha$, $\beta$, $\chi$, $\delta$, and $\epsilon$. Note that track "$\chi$" joins trails "V" and "X".

A track and the V-objects it contains are classified as stationary if all the trails it contains are stationary, and moving if all the trails it contains are moving. Otherwise, the track is classified as unknown. Track "$\chi$" in FIG. 14 is stationary; the remaining tracks are moving.

Figure 15:
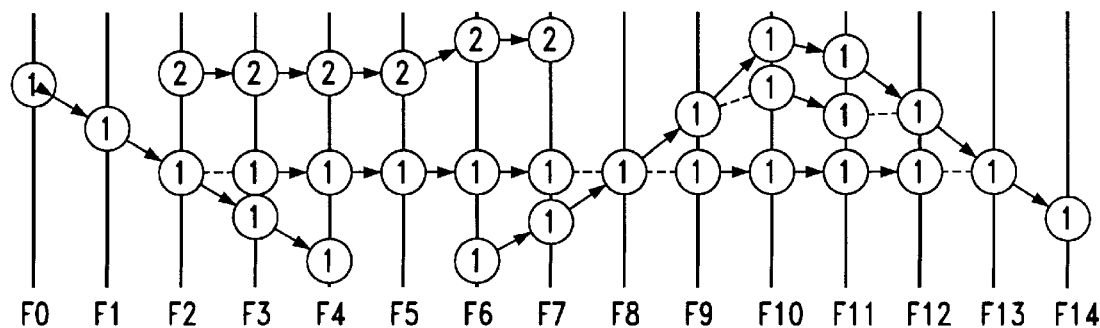
FIG. 15 illustrates traces.

A trace is a maximal-size, connected subdigraph of V-objects. A trace represents the complete trajectory of an object and all the objects with which it intersects. Thus, the motion graph in FIG. 10 contains two traces: one trace extends from $F_2$ to $F_7$; the remaining V-objects form a second trace. FIG. 15 labels V-objects on these traces with the numbers "1" and "2", respectively.

Note that the preceding groupings are hierarchical, i.e., for every trace E, there exists at least one track K, trail L, branch B, and stem M such that $E \supseteq K \supseteq L \supseteq B \supseteq M$. Furthermore, every V-object is a member of exactly one trace.

The motion analyzer scans the motion graph generated by the object tracker and groups V-objects into stems, branches, trails, tracks, and traces. Thus, these four definitions are used to characterize object trajectories in various portions of the motion graph. This information is then used to index the video according to its object motion content.

Eight events of interest are defined to designate various motion events in a video sequence.

Appearance—An object emerges in the scene.

Disappearance—An object disappears from the scene.

Entrance—A moving object enters in the scene.

Exit—A moving object exits from the scene.

Deposit—An inanimate object is added to the scene.

Removal—An inanimate object is removed from the scene.

Motion—An object at rest beings to move.

Rest—A moving object comes to a stop.

These eight events are sufficiently broad for a video indexing system to assist the analysis of many sequences containing multiple moving objects.

For example, valuable objects such as inventory boxes, tools, computers, etc., can be monitored for theft (i.e., removal), in a security monitoring application.

Likewise, the traffic patterns of automobiles can be analyzed (e.g., entrance/exit and motion/rest), or the shopping patterns of retail customers recorded (e.g., motion/rest and removal).

After the V-object grouping process is complete, the motion analyzer has all the semantic information necessary to identify these eight events in a video sequence. For each V-object V in the graph, the following rules are applied:

1. If V is moving, the first V-object in a track (i.e., the "head"), and indegree (V)>0, place an index mark designating an appearance event at V.
2. If V is stationary, the head of a track, and indegree (V)=0, place an index mark designating an appearance event at V.
3. If V is moving, the last V-object in a track (i.e., the "tail"), and outdegree (V)>0, place a disappearance index mark at V.
4. If V is stationary, the tail of a track, and outdegree (V)0, place a disappearance index mark at V.
5. If V is non-stationary (i.e. moving or unknown), the head of a track, and indegree (V)=0, place an entrance index mark at V.
6. If V is non-stationary, the tail of a track, and outdegree (V)=0, place an exit index mark at V.
7. If V is stationary, the head of a track, and indegree (V)=1, place a deposit index mark at V.
8. If V is stationary, the tail of a track, and outdegree (V)=1, place a removal index mark at V.

Rules 1–8 use track groupings to index the video at the beginning and end of individual object trajectories. Note, however, that rules 7 and 8 only account for the object deposited or removed from the scene; they do not index the V-object that caused the deposit or remove event to occur. For this purpose, we define two additional events Depositor—A moving object adds an inanimate object to the scene.

Remover—A moving object removes an inanimate object from the scene and apply two or more rules:

9. If V is adjacent to a V-object with a deposit index, place a depositor index mark at V.
10. If V is adjacent from a V-object with a removal index, place a remover index mark at V.

Rules 9–10 provide a distinction between the subject and object of deposit/remove events. This distinction is only necessary when the subject and object of the event must be distinguished. Otherwise, depositor/remover events are treated identically to deposit/remove events.

Finally, the indexing process applies rules to account for the start and stop events:

11. If V is the tail of a stationary stem $M_i$ and the head of a moving stem $M_j$ for which $|M_i| \geq h_M$ and $|M_j| \geq h_M$, then place a motion index mark at V. Here, $h_M$ is a lower size limit of stems to consider.
12. If V is the tail of a moving stem $M_i$ and the head of a stationary stem $M_j$ for which $|M_i| \geq h_M$ and $|M_j| \geq h_M$, then place a rest index mark at V.

The output of the motion analyzer 23 is a directed graph describing the motion of foreground objects annotated with object-based index marks indicating events of interest in the video stream. Thus, the motion analyzer 23 generates from the motion segmentation data a symbolic abstraction of the actions and interactions of foreground objects in the video. This approach enables content-based navigation and analysis of video sequences that would otherwise be impossible.

Figure 16:
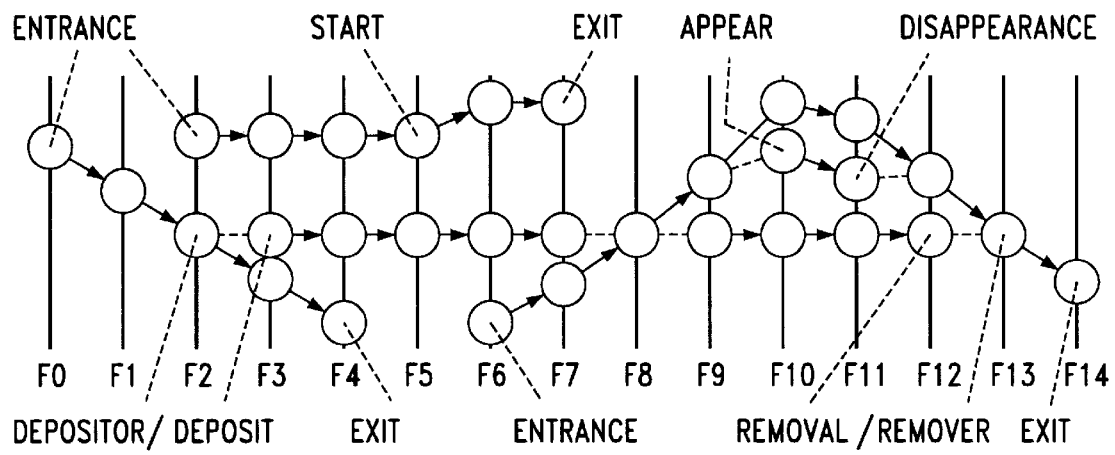
FIG. 16 illustrates indexing rules applied to FIG. 10.

FIG. 16 shows all the indexing rules applied to the example motion graph of FIG. 10. Note that despite the occlusion of the stationary object at frame $F_8$, the technique correctly places a single pair of "deposit" and "removal" indices at frames $F_3$ and $F_{12}$, respectively.

The recorder writes the video stream and meta-information into the video database for later retrieval. Since the meta-information record lends itself to an object-oriented representation, we experimented using the ARPA Open Object-Oriented Database (OODB) developed at Texas Instruments.(See David L. Wells, et al., "Architecture of an Open Object-Oriented Database Management System," IEEE Computer, pp. 74–82, October 1992.) The Open OODB allows straight-forward storage and retrieval of the meta-information in an object-oriented fashion. The input video data may also be stored in the Open OODB on a frame-per-frame basis; however, we found it most efficient to simply record the incoming video to a "flat" file referenced by objects in the OODB.

Optionally, the video meta-information can also be used to compress the video data for maximum storage efficiency. Recall that each V-object records a shape mask of its real-world object obtained from motion segmentation. Since the motion segmentation process captures the salient object motion in the video, the input data may be compressed substantially by recording this information to the video database rather than the entire video sequence.

In this case, the reference frame, $F_0$, is recorded in compressed form, perhaps using the JPEG still-picture compression standard. Then, information describing individual objects relative to the reference frame is recorded: the position and shape of the V-object region mask and its corresponding image data. The mask is efficiently run-length encoded; the V-object image data is then JPEG-encoded as well. On playback, the system first decodes $F_0$, then decodes the V-object images for each subsequent frame and maps these onto the reference frame using the V-object region masks. Using such a storage scheme, significant amounts of video can be stored on conventional magnetic disks at compression ratios of 30- to 250-to-1.

The AVI query engine retrieves video data from the database in response to queries generated at the graphical user interface. A valid query Y takes the form $Y=(C, T, V, R, E)$, where C is a video clip, $T=(t_i, t_j)$ specifies a time interval within the clip, V is a V-object within the clip meta-information, R is a spatial region in the field of view, and E is an object-motion event.

The clip C specifies the video sub-sequence to be processed by the query, and the (optional) values of T, V, R, and E define the scope of the query. Using this form, the AVI system user can make such a request as "find any occurrence of this object being removed from this region of the scene between 8am and 9am." Thus, the query engine processes Y by finding all the video sub-sequences in C that satisfy, T, V, R, and E.

In processing a given query, the query engine retrieves the V-object graph G corresponding to clip C from the video database, and performs the following steps:

1. If $T=(t_i, t_j)$ is specified in the query, G is truncated to a subgraph spanning frames $F_i$ to $F_j$.
2. If V is specified, G is further truncated to include only the trace containing V.

3. If V belongs to a track, G is further truncated to included to include only the track containing V.
4. If R is specified, G is truncated to include only those V-objects whose shape mask intersect the specified spatial region.
5. If E is specified, G is truncated to include only those V-objects with event indices matching E.
6. If E is not specified, G is truncated to include only those V-objects V with indegree(V)=0, i.e., the source nodes in G. This reduces the result to include only the first occurrence of real-world objects meeting the requirements of V, T, and R.

Thus, step 1 satisfies the temporal query constraints; steps 2 and 3 satisfy the object-based constraints by restricting the search to the most reliable path of V in the motion graph; step 4 filters V-objects to meet the spatial constraints; and steps 5 and 6 filter V-objects to match the specified event. The resulting graph G then contains only V-objects satisfying all the constraints of the query.

Figure 17:
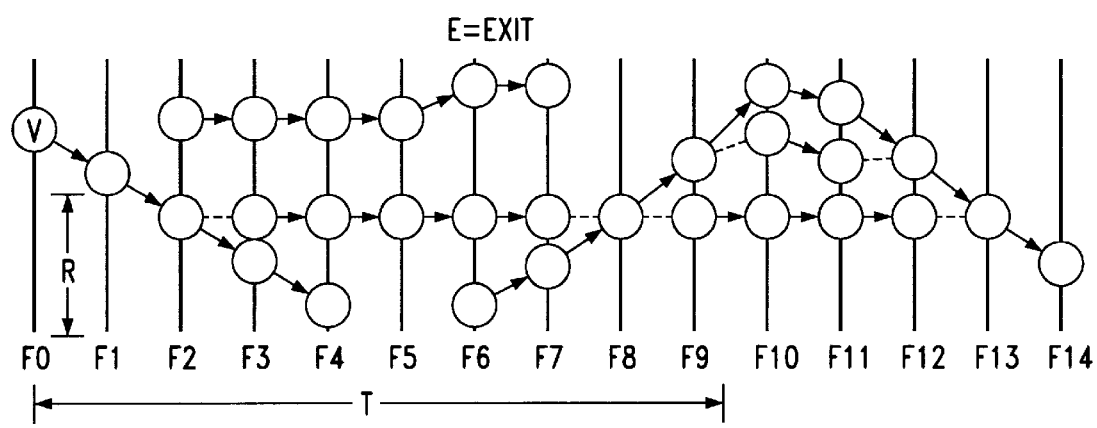
FIG. 17 illustrates a graphical depiction of the query Y=(C,T,V,R,E)
Figure 18:
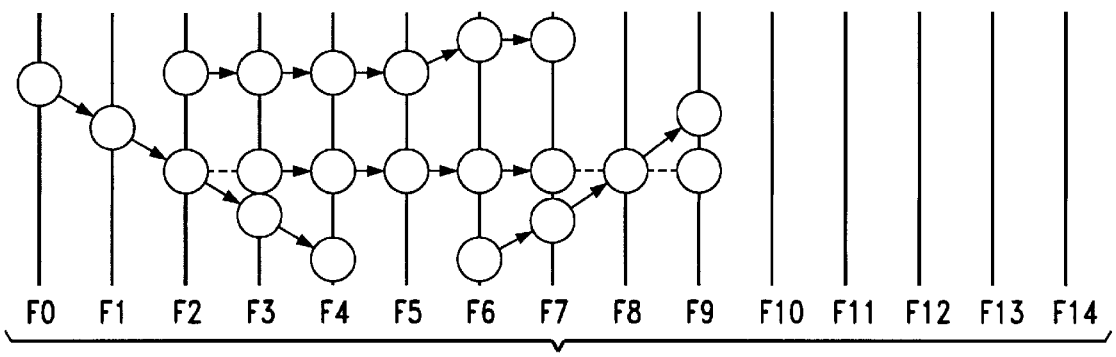
FIG. 18 illustrates processing of temporal constraints.
Figure 19:
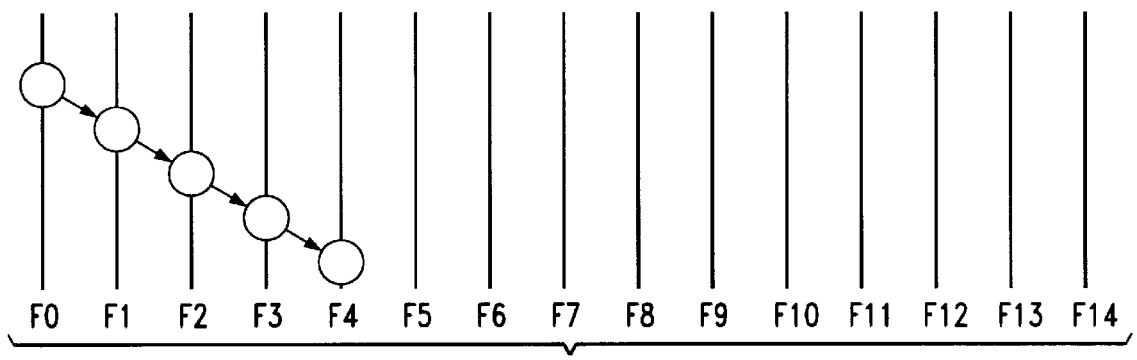
FIG. 19 illustrates processing of object based constraints.
Figure 20:
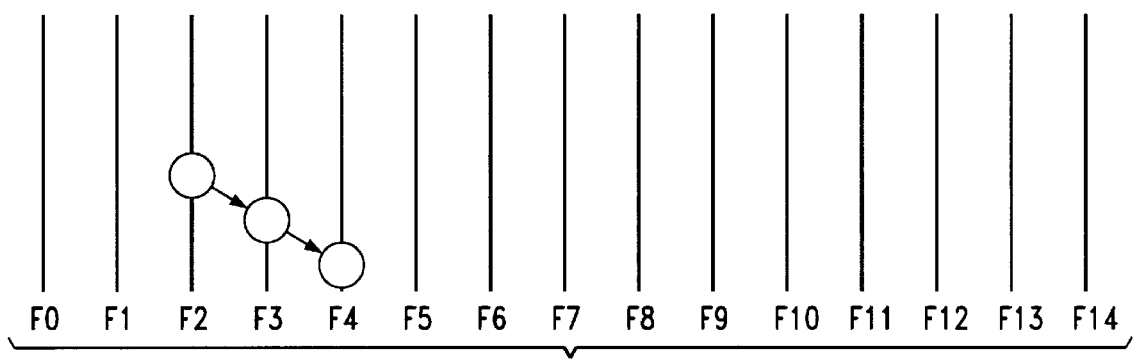
FIG. 20 illustrates processing of spatial constraints.
Figure 21:
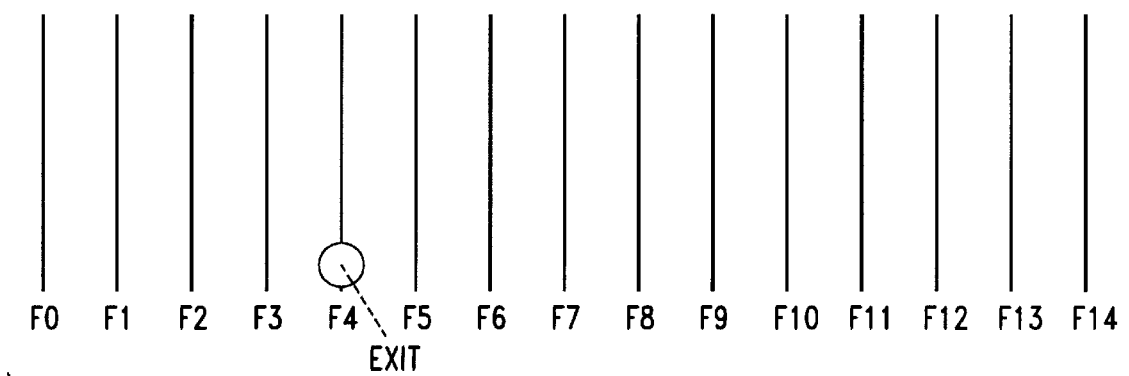
FIG. 21 illustrates processing of event-based constraints.

FIG. 17 is a graphical depiction of a query Y=(C, T, V, R, E) applied to the V-object graph of FIG. 10; i.e., "show if object V exits the scene in region R during the time interval T". FIGS. 18–21 illustrate the steps performed by the query engine on this sequence.

Finally, for each V-object $V_i$ satisfying the query, the query engine generates a result, $R_i=(C_i, V_i)$, consisting of a clip, $C_i$, and a pointer to the V-object. The first and last frames of $C_i$ are set to reflect the time constraint of the query, T, if specified; otherwise, they are set to those of C, the clip specified in the query. The "frame of interest" of $C_i$ is set to the frame containing $V_i$. These results are sent to the graphical user interface for display.

Figure 22:
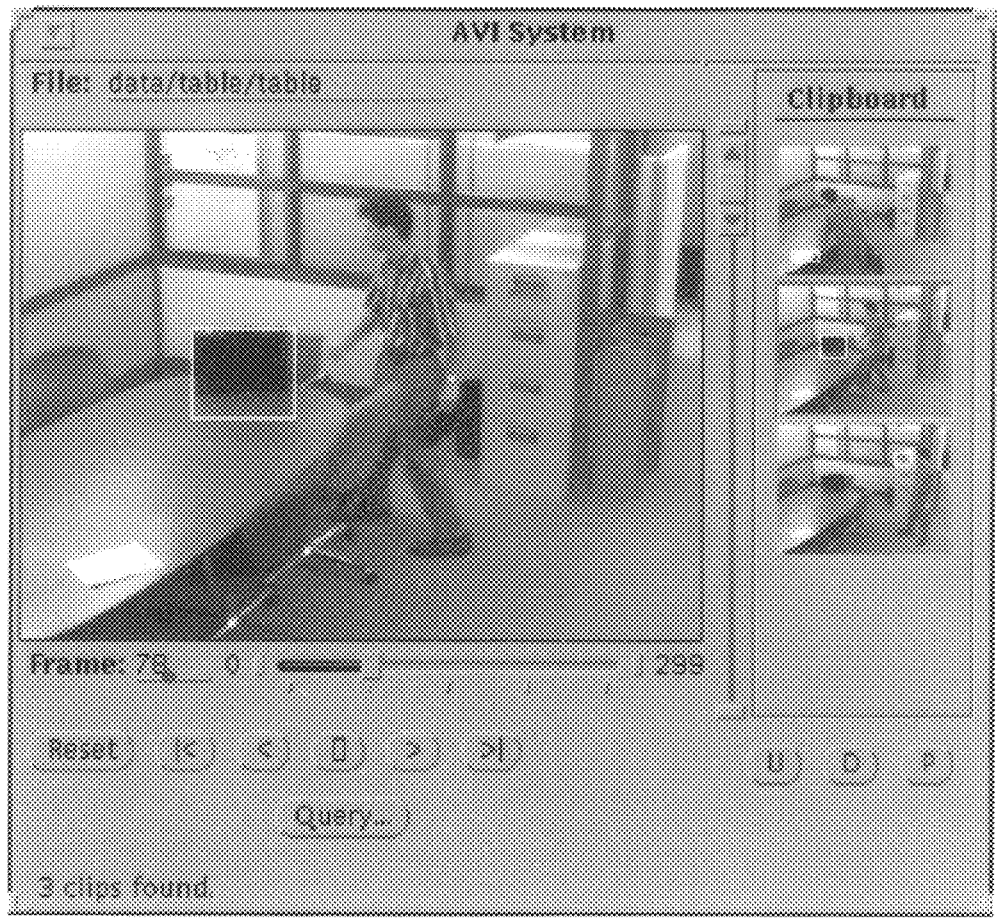
FIG. 22 illustrates a picture of the "playback" portion of the GUI.
Figure 23:
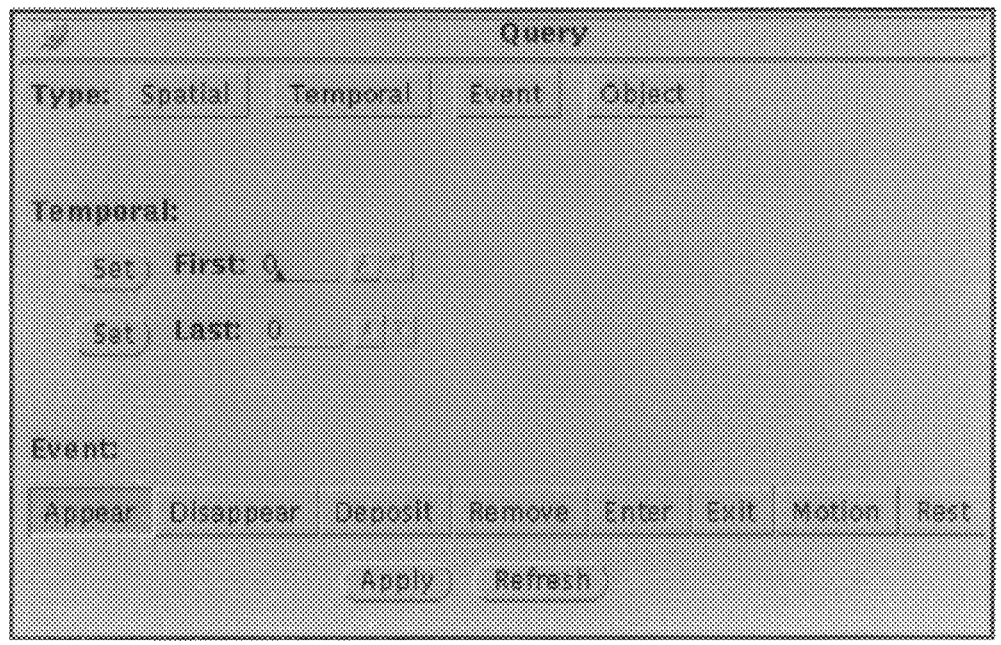
FIG. 23 illustrates the query interface.

A graphical user interface (GUI) 28 enables users to analyze video sequences via spatial, temporal, event-, and object-based query processing. FIG. 22 shows a picture of the "playback" portion of the GUI. The interface allows the user to select video clips for analysis and play them using VCR-like controls (i.e., forward, reverse, stop, step-forward, step back). The GUI 28 also provides a system "clipboard" for recording intermediate analysis results. For example, the clipboard shown in FIG. 23 contains three clips, the result of a previous query by the user. The user may select one of these clips and pose a query using it. The resulting clip(s) would then by pushed onto the top of the clipboard stack. The user may peruse the stack using the button-commands "up", and "down" and "pop".

Figure 24A:
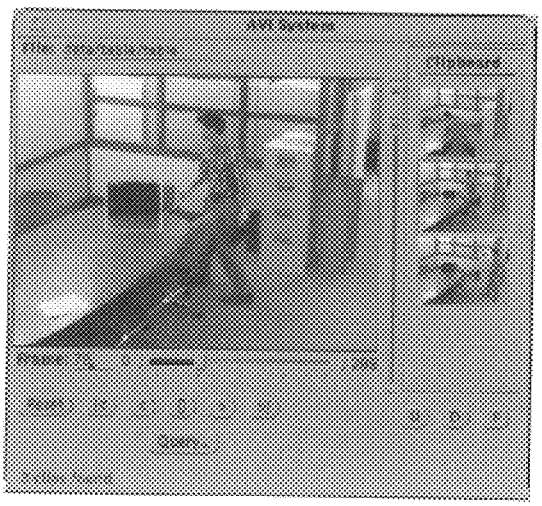
FIG. 24 illustrates video content analysis using advanced queries with video clips a, b, c and d.
Figure 24B:
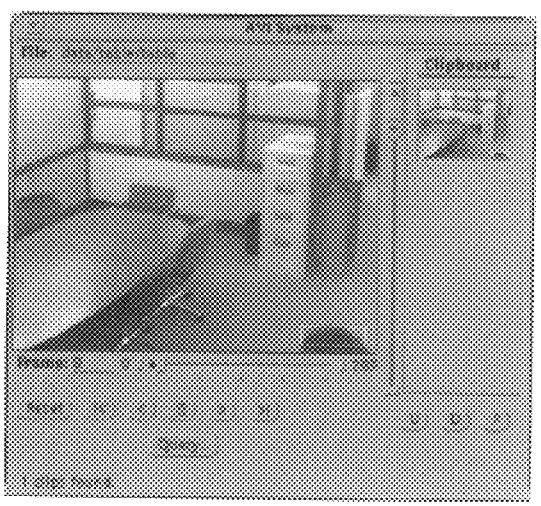
Figure 24C:
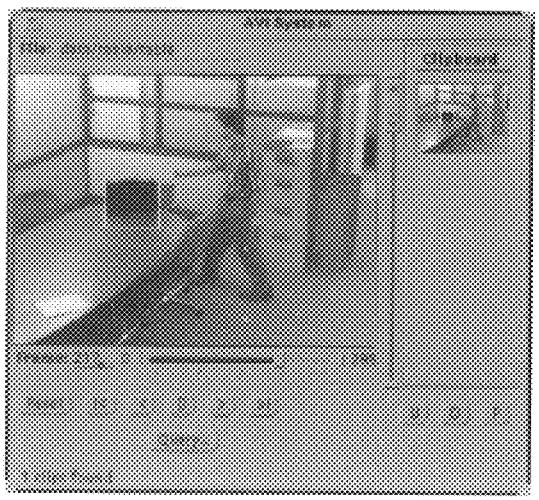
Figure 24D:
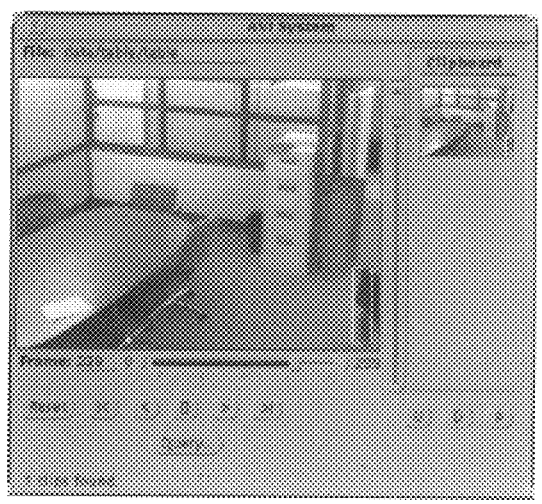
Figure 25:
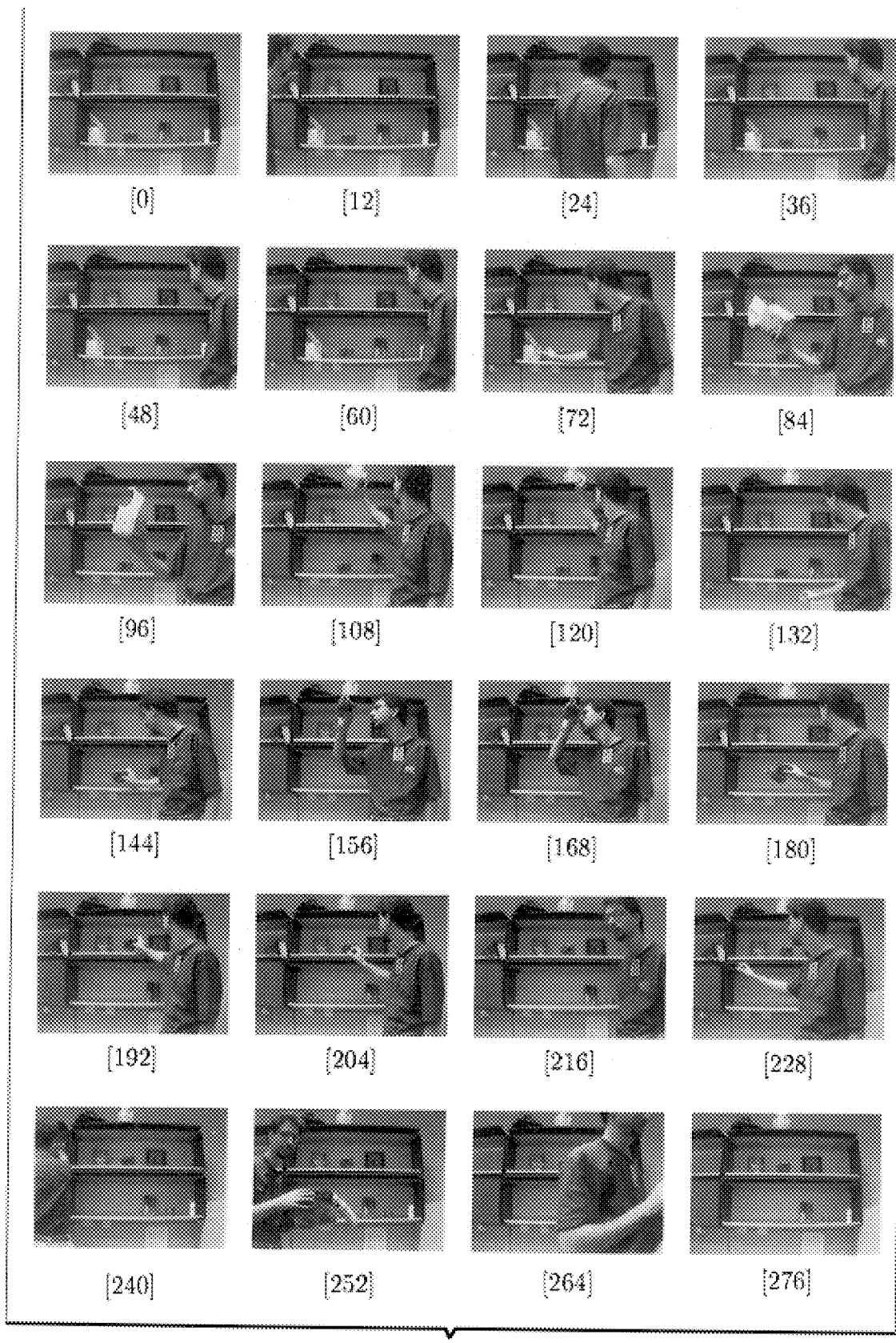
FIG. 25 illustrates frames from test sequence 2.

FIG. 25 shows the query interface to the AVI system. Using this interface, the user may pose full queries of the form Y=(C, T, V, R, E) as described above. Using the "Type" field, the user may specify any combination of the four query types. The query interface provides fields to set parameters for temporal and event-based queries; parameters for spatial and object-based queries may be set using the mouse inside the video playback window shown in FIG. 24. After specifying the query type and parameters, the user executes the "Apply" button-command to pose the query to the AVI system. The resulting clips are then posted to the system clipboard.

FIG. 2 shows frames from a example video sequence with motion content characteristic of security monitoring applications. In this sequence, a person enters the scene, deposits a piece of paper, a briefcase, and a book, and then exits. He then re-enters the scene, removes the briefcase, and exits again. If a user forms the query "find all deposit events", the AVI system will respond with video clips depicting the person depositing the paper, briefcase and book. FIG. 3 shows the actual result given by the AVI system in response to this query.

FIG. 24 demonstrates how more complex queries can be applied. After receiving the three clips of FIG. 3 in response to the query "show all deposit events", the AVI system user is interested on learning more about fate of the briefcase in the sequence of FIG. 3. First, the user retrieves the clip highlighting frame $F_{78}$ (shown in FIG. 24(a)) from the clipboard and applies the query "find entrance events of this object" to the person shown depositing the briefcase. The system responds with a single chip showing the first instance of the person entering the scene, as shown in FIG. 24(b). The user can play the clip at this point and observe the person carrying the briefcase into the room.

Next, the user applies the query "find removal events (caused by) this object" to the person carrying the briefcase. The system responds by saying there are no such events. (Indeed, this is correct because the person removes no objects until after he leaves and re-enters the room—at that point, the person is defined as a different object.)

The user then returns to the original clip FIG. 24(a) by popping the clipboard stack twice. Then the user applies the query "find removal events of this object" to the briefcase. The system responds with a single clip of the second instance of the person removing the briefcase, as shown in FIG. 24(c).

Finally, the user specifies the query "find exit events of this object" to the person removing the briefcase. The system then responds with the single clip of the person as he leaves the room (with the briefcase), as shown in FIG. 24(d).

The video indexing technique described in this application was tested using the AVI system on three video sequences containing a total of 900 frames, 18 objects, and 44 events. The sequences where created as mock-ups of different domains of scene monitoring.

Test Sequence 1 (i.e., the "table" sequence) is characteristic of an inventory or security monitoring application (see FIG. 2). In it, a person adds and removes various objects from a room as recorded by an overhead camera. It contains 300 frames captured at approximately 10 frames per second and 5 objects generating 10 events. The sequence contains entrance/exit and deposit/removal events, as well as two instances of object occlusion.

Test Sequence 2 (the "toys" sequence) is characteristic of a retail customer monitoring application (see FIG. 25). In it, a customer stops at a store shelf, examines different products, and eventually takes one with him. In contains 285 frames at approximately 10 frames per second and 4 objects generating 14 events. This is the most complicated of the test sequences: it contains examples of all eight events, displays several instances of occlusion, and contains three foreground objects in the initial frame.

Figure 26:
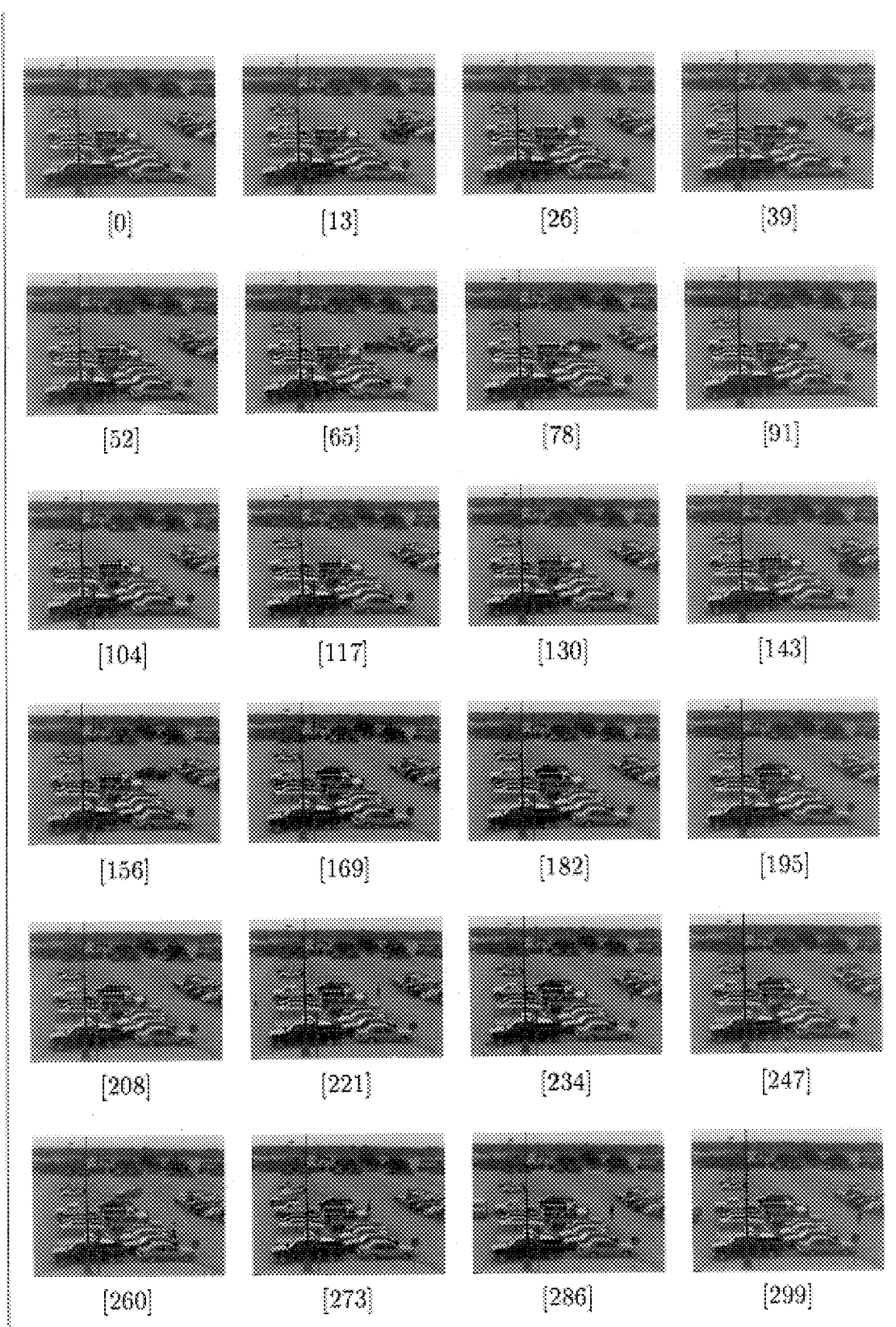
FIG. 26 illustrates frames from test sequence 3.

Test Sequence 3 (the "park" sequence) is characteristic of a parking lot traffic monitoring application (see FIG. 26). In it, cars enter the parking lot and stop, drivers emerge from their vehicles, and pedestrians walk through the field of view. It contains 315 frames captured at approximately 3 frames per second and 9 objects generating 20 events. Before digitalization, the sequence was first recorded to 8 mm tape with consumer-grade equipment and is therefore the most "noisy" of the test sequences.

The performance of the AVI system was measured by indexing each of the test sequences and recording its success or failure at detecting each of the eight event indices. Tables 1–3 report event detection results for the AVI system on the three test sequences. For each event, the tables report the number of such events actually present the sequence, the number found by the AVI system, the Type I (false negative) errors, and the Type II (false positive) errors.

Of the 44 total events in the test sequences, the AVI system displays 10 Type II errors but only one Type I error. Thus, the system is conservative and tends to find at least the desired events.

The system performed the worst on test Sequence 3, where it displayed the only Type I error and 8 of the 10 total Type II errors. This is primarily due to three reasons:

1. Noise in the sequence, including vertical jitter from a poor frame-sync signal, resulted in very unstable motion segmentation masks. Thus, stationary objects appear to move significantly.

2. The method used to track objects through occlusions presently assumes constant object trajectories. A motion tracking scheme that is more robust in the presence of rapidly changing trajectories will result in fewer false positives for many of the events. See S. Intille and A. Bobick, Closed-World Tracking, in *Proceedings of the Fifth International Conference on Computer Vision*, 672–678 (1995).

3. No means to track objects through occlusion by fixed scene objects is presently used. The light pole in the foreground of the scene temporarily occludes pedestrians who walk behind it, causing pairs of false entrance/exit events.

However, the system performed very well on Test Sequences 1 and 2 despite multiple simultaneous occlusions and moving shadows. And in all the sequences, the system is sufficiently robust to accurately respond to a large number of object-specific queries.

TABLE 1

Event detection results for Test Sequence 1

|  | Actual | Detected | Type I | Type II |
| --- | --- | --- | --- | --- |
| Appearance | 0 | 0 | 0 | 0 |
| Disappearance | 2 | 2 | 0 | 0 |
| Entrance | 2 | 2 | 0 | 0 |
| Exit | 2 | 3 | 0 | 1 |
| Deposit | 3 | 3 | 0 | 0 |
| Removal | 1 | 1 | 0 | 0 |
| Motion | 0 | 0 | 0 | 0 |
| Rest | 0 | 0 | 0 | 0 |
| Total | 10 | 11 | 0 | 1 |

TABLE 2

Event detection results for Test Sequence 2

|  | Actual | Detected | Type I | Type II |
| --- | --- | --- | --- | --- |
| Appearance | 3 | 3 | 0 | 0 |
| Disappearance | 2 | 2 | 0 | 0 |
| Entrance | 1 | 1 | 0 | 0 |
| Exit | 1 | 2 | 0 | 1 |
| Deposit | 2 | 2 | 0 | 0 |
| Removal | 3 | 3 | 0 | 0 |
| Motion | 1 | 1 | 0 | 0 |
| Rest | 1 | 1 | 0 | 0 |
| Total | 14 | 15 | 0 | 1 |

TABLE 3

Event detection results for Test Sequence 3

|  | Actual | Detected | Type I | Type II |
| --- | --- | --- | --- | --- |
| Appearance | 2 | 3 | 0 | 1 |
| Disappearance | 0 | 2 | 0 | 2 |
| Entrance | 7 | 8 | 0 | 1 |
| Exit | 8 | 9 | 0 | 1 |
| Deposit | 0 | 0 | 0 | 0 |
| Removal | 0 | 0 | 0 | 0 |
| Motion | 0 | 1 | 0 | 1 |
| Rest | 3 | 4 | 1 | 2 |
| Total | 20 | 27 | 1 | 8 |

Figure 27:
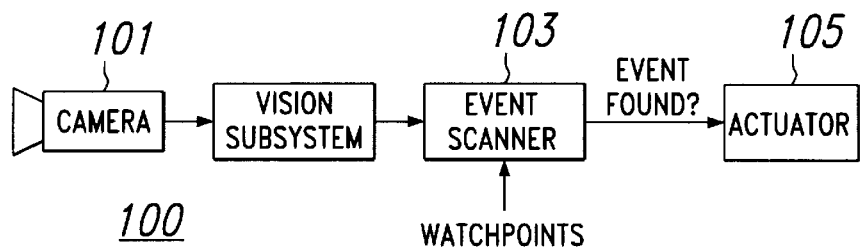
FIG. 27 illustrates video indexing in a real-time system.

The video indexing system described here may also be implemented as a real-time system, as, for example, in an advanced video motion detector. FIG. 27 shows a diagram of such implementation. Here, the vision subsystem 100 processes the output of the camera 101 frame-by-frame, and continuously updates a motion graph annotated with event index marks. An event scanner 103 continuously reads the motion graph updates and searches for motion events as specified by pre-set watchpoints. These watchpoints may take the same form as queries from the AVI user interface, i.e. Y=(C,T,V,R,E). When the criteria for one of the watchpoints is met, the event scanner signals an actuator 105 (such as an alarm).

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of providing video indexing comprising the steps of:

(a) detecting objects in video to provide detected objects comprising the step of performing motion segmentation including image differencing, thresholding, morphology and connected component analysis;

(b) analyzing motion of said detected objects comprising the step of tracking said detected objects using linear prediction of object position;

(c) generating a symbolic motion description of object motion; and (d) placing index marks in said symbolic motion description to identify occurrence of events in the video.

2. The method of claim 1 wherein said step of detecting objects includes performing motion segmentation comprising the steps of image differencing, thresholding, connected component analysis, image smoothing and morphology.

3. The method of claim 1 wherein said analyzing step includes associating objects in successive frames of said video using a mutual-nearest-neighbor criterion.

4. The method of claim 1 wherein said analyzing step includes determining paths of said objects and intersection with paths of other objects.

5. The method of claim 1 wherein said generating step includes generating a directed graph reflective of the paths and path intersections of said objects.

6. The method of claim 1 wherein said generating step includes generating a record of image statistics for objects in every video frame.

7. The method of claim 6 wherein said generating a record of image statistics step includes generating size, shape, position, and time-stamp of objects in every video frame.

8. The method of claim 1 wherein said generating step includes generating hierarchical graph node groupings reflective of paths and intersections of said objects.

9. The method of claim 8 wherein said placing index marks step includes placement of index marks corresponding to motion events in accordance with said hierarchical graph node groupings.

10. The method of claim 9 wherein said placing index marks step includes use of a rule-based classifier.

11. The method of claim 9 wherein said placing index marks step corresponding to motion events includes placement of one or more marks corresponding to appearance, disappearance, deposit, removal, entrance, exit, motion, or rest of objects.

12. A method of providing video indexing comprising the steps of:
 (a) detecting objects in a video to provide detected objects;
 (b) analyzing motion of said detected objects;
 (c) generating a symbolic motion description of object motion; and
 (d) placing index marks in said symbolic motion description to identify occurrence of events in the video, said generating step includes generating primary and secondary graph links reflective of the likelihood of accurate motion analysis.

13. A method of providing video indexing comprising the steps of:
 (a) detecting objects in a video to provide detected objects;
 (b) analyzing motion of said detected objects;
 (c) generating a symbolic motion description of object motion; and
 (d) placing index marks in said symbolic motion description to identify occurrence of events in the video, said generating step includes generating hierarchial graph node groupings reflective of paths and intersections of said objects, said hierarchial graph node groupings reflect the likelihood of accurate motion analysis.

14. A method for real-time detection of video events comprising the steps of:
 (a) detecting object in real-time video to provide detected objects; said step of detecting including performing motion segmentation comprising the steps of image differencing, thresholding, connected components analysis and morphology;
 (b) analyzing motion of said detected objects including the step of tracking said detected objects using linear prediction of object positions;
 (c) generating a symbolic motion description of object motion;
 (d) placing index marks in said symbolic motion description to identify occurrence of events in video; and
 (e) providing a signal in response to the occurrence of said video events.

15. The method of claim 14 wherein said step of providing a signal for the purpose of sounding an alarm.

16. The method of claim 14 wherein said step of providing a signal to make a record.

17. The method of claim 15 wherein said step of providing a signal comprises initiation of an automated action by signaling one of a computer program or electronic device.

18. A method to assist human analysis of video data comprising the steps of:
 (a) detecting objects in a video to provide detected objects; said detecting step including performing motion segmentation comprising the steps of image differencing, thresholding, connected component analysis and morphology;
 (b) analyzing motion of said objects; said analyzing step including the step of tracking said detected objects using linear prediction of said object positions;
 (c) generating a symbolic motion description of object motion;
 (d) placing index marks in said symbolic motion description to identify occurrence of events in video;
 (e) receiving content-base queries;
 (f) matching queries with symbolic video information and said index marks; and
 (g) providing video sequences corresponding to the query.

19. The method of claim 18 wherein said step of receiving content-base queries includes receiving queries with constraints involving one or more of a video clip, time interval, object, spatial region, or motion event.

20. The method of claim 19 wherein constraints for said queries may be specified by manipulation of video clips.

21. The method of claim 19 wherein said step of matching queries with symbolic video information includes filtering symbolic information to meet the query constraints of one or more video clip, time interval, object, spatial region, or motion event.

22. A method to assist human analysis of video data comprising the steps of:
 (a) detecting objects in a video to provide detected objects;
 (b) analyzing motion of said objects;
 (c) generating a symbolic motion description of object motion;
 (d) placing index marks in said symbolic motion description to identify occurrence of events in video;
 (e) receiving content-based queries;
 (f) matching queries with symbolic video information and said index marks; and
 (g) providing video sequences corresponding to the query, said step of providing video sequences includes a system clipboard with sets of video clips for progressive refinement of content based queries and query results.

* * * * *